(12) United States Patent
Shimmel et al.

(10) Patent No.: US 8,398,038 B2
(45) Date of Patent: Mar. 19, 2013

(54) WHEEL SUPPORT

(75) Inventors: Jeffrey T. Shimmel, Solsberry, IN (US);
James G. Buechler, Jasper, IN (US);
Michael L. Holzmeyer, Bloomfield, IN (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 613 days.

(21) Appl. No.: 12/627,965

(22) Filed: Nov. 30, 2009

(65) Prior Publication Data
US 2011/0127393 A1 Jun. 2, 2011

(51) Int. Cl.
*F16M 11/06* (2006.01)
(52) U.S. Cl. ............... 248/185.1; 248/354.5; 16/19
(58) Field of Classification Search ............... 248/185.1, 248/354.3; 89/38; 16/19; 49/358, 425, 396; 280/43
See application file for complete search history.

(56) References Cited

U.S. PATENT DOCUMENTS

| | | | | |
|---|---|---|---|---|
| 332,629 A * | 12/1885 | Valkenbergh et al. | ............ | 16/19 |
| 1,328,775 A * | 1/1920 | Van Meter | ............ | 16/19 |
| 1,482,954 A * | 2/1924 | Tideman | ............ | 16/19 |
| 1,567,932 A * | 12/1925 | Eschenbacher | ............ | 49/396 |
| 2,617,620 A * | 11/1952 | Jessop | ............ | 254/98 |
| 3,138,994 A * | 6/1964 | Blunk | ............ | 89/37.01 |
| 3,353,852 A * | 11/1967 | Wood | ............ | 403/189 |
| 3,438,305 A * | 4/1969 | Nollet | ............ | 89/41.22 |
| 4,590,709 A * | 5/1986 | Katsman et al. | ............ | 49/396 |
| 4,752,057 A * | 6/1988 | Hagemes | ............ | 248/354.5 |
| 4,788,741 A * | 12/1988 | Hilborn | ............ | 16/35 R |
| 5,320,439 A * | 6/1994 | Perrault et al. | ............ | 403/379.1 |
| 5,590,863 A * | 1/1997 | Sasaki | ............ | 248/354.3 |
| 5,826,847 A * | 10/1998 | Warner et al. | ............ | 248/354.1 |
| 6,283,428 B1 * | 9/2001 | Maples et al. | ............ | 248/282.1 |
| 6,286,411 B1 * | 9/2001 | Sanderson | ............ | 89/37.16 |
| 6,746,183 B1 * | 6/2004 | Sullivan | ............ | 405/272 |
| 6,810,561 B1 * | 11/2004 | Liu | ............ | 16/42 T |
| 7,188,445 B2 * | 3/2007 | Lehman | ............ | 42/94 |
| 7,415,790 B1 * | 8/2008 | Ruhland et al. | ............ | 42/94 |
| 7,431,531 B2 * | 10/2008 | Carnevali | ............ | 403/328 |
| 7,506,890 B2 * | 3/2009 | Chen | ............ | 280/647 |
| 7,584,932 B2 * | 9/2009 | Shih | ............ | 248/354.3 |
| 7,806,381 B2 * | 10/2010 | Sisk Horne et al. | ............ | 248/354.5 |
| 7,837,413 B1 * | 11/2010 | Kundel, Sr. | ............ | 405/283 |
| 2004/0237372 A1 * | 12/2004 | Frye | ............ | 42/94 |
| 2007/0266525 A1 * | 11/2007 | Underwood | ............ | 16/31 R |
| 2008/0047420 A1 * | 2/2008 | Carroll et al. | ............ | 89/37.01 |
| 2008/0047421 A1 * | 2/2008 | Carroll et al. | ............ | 89/38 |
| 2009/0321589 A1 * | 12/2009 | Hampton et al. | ............ | 248/121 |

* cited by examiner

OTHER PUBLICATIONS

Webpage: http://www.dillanaero.com/uimages//gallery_images/chinook_ga14.jpg accessed Nov. 30, 2009.

*Primary Examiner* — Terrell McKinnon
*Assistant Examiner* — Daniel J Breslin
(74) *Attorney, Agent, or Firm* — Christopher A. Monsey (57) ABSTRACT

A wheel support assembly is mounted to a pivotable system spanning an opening, with the pivotable system mounted to one side of the opening at a pivotable connection and to another side of the opening at a removable connection. The support assembly is disposed proximate the removable connection and spaced apart from the pivotable connection, and has a wheel positioned and oriented to support the pivotable system weight that would otherwise be cantilevered as the pivotable system rotates about the pivotable support. The wheel support assembly may include a vertically adjustable wheel that may be adjusted to remain just out of contact with the support surface when the pivotable assembly is connected to both the pivotable and the removable connections.

7 Claims, 5 Drawing Sheets

WHEEL SUPPORT

STATEMENT REGARDING FEDERALLY SPONSORED RESEARCH OR DEVELOPMENT

The invention described herein includes contributions by one or more employees of the Department of the Navy made in performance of official duties and may be manufactured, used, licensed by or for the United States government without payment of any royalties thereon.

BACKGROUND

The present disclosure relates to pivotable wall mounted systems. More particularly, the present disclosure relates to a wheel support for helicopter mounted weapon systems and a method for using the same.

Systems are often mounted across the span of an opening in a structure, and may be selectively rotatable away from the opening. For example, military helicopters frequently have machine guns or other weapon systems mounted within doorways or windows formed in the helicopter airframe to provide for defense of the aircraft from within. Because helicopter mounted weapon systems may be heavy and/or may generate large recoil forces when in use, these systems are typically secured to the helicopter airframe proximate the opening through which the weapon is aimed.

For example, some helicopter-mounted weapon systems utilize a mount which is secured to the airframe at each side or border of the opening through which it is aimed. In order to facilitate ingress and egress of helicopter occupants through these weapon-equipped openings, one side of the mount may be pivotably connected at one side of the helicopter airframe, while the other side of the mount will be removably connected to the airframe at the opposing side of the opening. When occupants are entering or exiting the aircraft, the weapon system and mount can be decoupled from the airframe at the removable mounting point and pivoted about the pivotable mounting point, thereby swinging the system either inboard or outboard so that the opening is no longer blocked by the system. Once the occupants have finished entering or exiting the aircraft, the mount may be pivoted back into a position in which the system spans, and partially blocks, the opening. The removable mounting point may be secured so that the weight of the pivotable system and mount are once again supported at both sides of the opening.

However, when the mount is decoupled from the removable mounting point, the weight of the weapon system is cantilevered away from the pivotable mounting point at the other side of the airframe. What is needed is a system and/or method to support this cantilevered weight while maintaining the pivotable function of the mounting system.

SUMMARY

The present disclosure provides a wheel support assembly mounted to a pivotable system spanning an opening, with the pivotable system mounted to one side of the opening at a pivotable connection and another side of the opening at a removable connection. The support assembly is disposed proximate the removable connection and spaced apart from the pivotable connection, and has a wheel positioned and oriented to support the pivotable system weight that would otherwise be cantilevered as the pivotable system rotates about the pivotable support. The wheel support assembly may include a vertically adjustable roller, such as a wheel, which may be adjusted to remain just out of contact with the support surface when the pivotable assembly is connected to both the pivotable and the removable connections.

In one embodiment, a wheel support for supporting a pivotable system includes: an extension member having a longitudinal axis and an aperture running transversely through the extension member, the extension member extending generally downwardly from the pivotable system; a yoke having a threaded shaft with an elongate slot therethrough, with the yoke threadably received by a lower end of the extension member so that the yoke is vertically adjustable with respect to the extension member; a pin sized to be receivable in the aperture and in the slot, with the yoke being rotationally and vertically fixed with respect to the extension member when the pin is received within the slot; and a wheel having an axis of rotation substantially normal to the longitudinal axis of the extension member, with the wheel rotatably attached to the yoke so that the wheel is vertically adjustable with respect to the extension member.

In one aspect of the present embodiment, the wheel support may further include a bushing disposed between the extension member and the yoke, with the bushing threadably attached to the yoke and the bushing fixedly attached to the extension member. The vertical adjustment of the yoke may be accomplished by rotating the yoke. The bushing may be fixed to the extension member by a fastener.

In another aspect, the extension member may further include a pinhole sized to receive the pin, as well as a first registration mark proximate the yoke, with the yoke having a second registration mark proximate the extension member. The first and second registration marks may be positioned and oriented to align with one another when the slot is aligned with the pinhole.

In yet another aspect, the wheel support may further include a mounting bracket having a mounting plate portion and a mounting tube portion, with the mounting bracket adapted to fixedly mount to the pivotable system.

In yet another aspect, the wheel may be arranged so that the axis of rotation of the wheel is substantially normal with the pivot axis of the pivotable system.

In another aspect, the pivotable system may be a weapon system mounted proximate an opening, with the opening disposed in the wall of a vehicle.

In another embodiment, a pivotable assembly that is mounted above a support surface and within an opening in a wall includes a pivotable system having a pivot with a pivot axis oriented normal to the support surface. The pivotable system may also have an arm with a first end mounted at the pivot and a second end spaced away from the pivot. The arm may be pivotably connected at a first boundary of the opening, and the arm may also be removably connected at a second boundary of the opening. The pivotable system may further include a wheel support having an extension member attached to the pivotable system, the extension member extending downwardly toward the support surface, and a wheel rotatable about an axis of rotation disposed transverse to the extension member. The wheel may be adjustably mounted to the extension member so that the wheel is upwardly and downwardly moveable. The wheel support may be fixed to the pivotable system so that the axis of rotation of the wheel is substantially normal with the pivot axis.

In one aspect of the present embodiment, the wheel support may also include a yoke attached to a lower end of the extension member, with the yoke vertically adjustable with respect to the extension member, and a bushing disposed between the extension member and the yoke. The bushing may be threadably attached to the yoke, and may also be fixedly attached to the extension member, so that the vertical adjustment of the yoke comprises rotating the yoke. The bushing may be fixed to the extension member by a fastener.

In another aspect, the wheel support may further include a pin, with the yoke having an elongate slot sized to receive the pin. The yoke may be rotationally and vertically fixed with respect to the extension member when the pin is received within the elongate slot.

In another aspect, the wheel support may further include a mounting bracket having a mounting plate portion and a mounting tube portion, with the mounting bracket adapted to fixedly mount to the pivotable system.

In yet another aspect, a gap may exist between the wheel and the support surface when the arm is pivotably connected at the first boundary and the arm is removably connected at the second boundary, with the gap being between just above zero inches and 0.375 inches. Alternatively, the gap may be between 0.040 inches and 0.250 inches. In yet another alternative, the gap may be between 0.080 inches and 0.125 inches.

In still another aspect, the pivotable system may be a weapon system mounted proximate an opening, with the opening being disposed in the wall of a vehicle. The support surface may also be disposed within the interior of the vehicle.

In a further embodiment, a method of supporting a pivotable system may include: pivotably connecting a first side of a pivotable system proximate a first boundary of an opening disposed above a support surface, the first side defining an axis normal to the support surface about which the pivotable system pivots; removably connecting a second side of the pivotable system proximate a second boundary of the opening, the first side opposed to the second side and the first boundary opposed to the second boundary, so that the pivotable system spans the opening when the second side is connected proximate the second boundary; attaching a wheel support assembly to the pivotable system so that the wheel support assembly extends downwardly toward the support surface, with a wheel of the wheel support assembly positioned to define a gap between the support surface and the wheel when the pivotable system is connected proximate the first and second boundaries; and pivoting the pivotable system about the vertical axis so that the second side is unsupported at the second boundary and the wheel touches the support surface.

In one aspect of the present embodiment, the step of attaching a wheel support assembly may further include vertically adjusting the wheel to define the gap between the wheel and the support surface while the pivotable system is connected at the first and second boundaries. The step of vertically adjusting the wheel may be accomplished by rotating the yoke.

In another aspect, the step of attaching a wheel support assembly may further include at least one of the following: fastening a mounting bracket of the wheel support assembly to the pivotable system; affixing a leg to a mounting plate portion of the mounting bracket; affixing a bushing with a threaded bore to the leg; threadably engaging a yoke with the threaded bore of the bushing; and rotatably attaching a wheel to the yoke.

In another aspect, the gap may be between just above zero inches and 0.375 inches. Alternatively, the gap may be between 0.040 inches and 0.250 inches. In yet another alternative, the gap may be between 0.080 inches and 0.125 inches.

In yet another aspect, the method may further include the step of pivoting the pivotable system further, so that the second side moves along an arc-shaped path and the wheel support assembly rotates through a corresponding arc-shaped path, and the pivotable system is substantially removed from the opening.

BRIEF DESCRIPTION OF THE DRAWINGS

The foregoing aspects and many of the attendant advantages of this invention will become more readily appreciated as the same become better understood by reference to the following detailed description when taken in conjunction with the accompanying drawings.

DETAILED DESCRIPTION

Referring generally to FIGS. 1-3, 5A and 5B, wheel support assembly 10 includes mounting bracket 12 and clamp 44, an extension member or leg 20 and wheel 32 coupled with leg 20 via yoke 26. Leg 20 is coupled with mounting bracket 12 via leg fastener 22 so that leg 20 is fixed with respect to mounting bracket 12. Mounting bracket 12 is a unitary assembly including a mounting tube portion 16 having a cavity sized to receive an upper portion of leg 20, and a mounting plate portion 14 sized and configured to be attached to a pivotable system, as described below. Yoke 26 is received within a lower portion of leg 20 and fixed by a fastener 30, with a bushing 24 being optionally disposed between leg 20 and yoke 26 (FIG. 2), as also described below. Wheel 32 is rotatably mounted to yoke 26 via axle 34 so that wheel 32 is freely rotatable within yoke 26. Washers 36 may be disposed between wheel 32 and respective portions of yoke 36 to promote smooth rotation.

Figure 2:
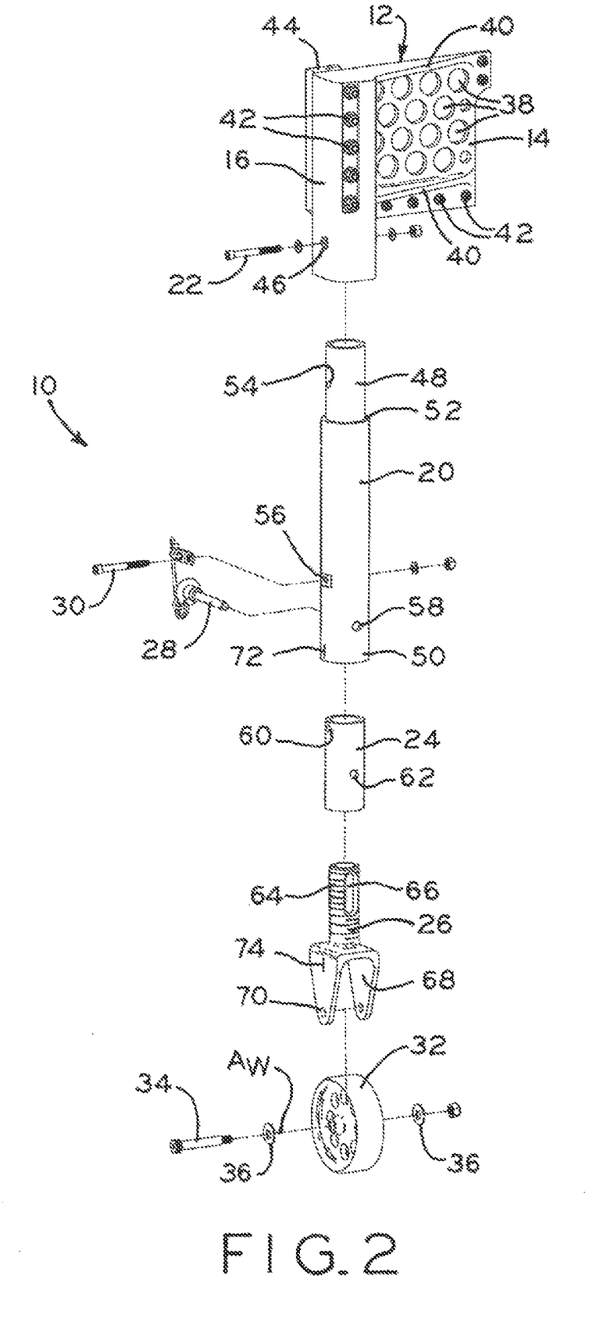
FIG. 2 is a perspective, exploded view of the wheel support assembly shown in FIG. 1.

Referring now to FIG. 2, mounting bracket 12 includes plate portion 14 and tube portion 16. Plate portion 14 of bracket 12 may have a plurality of apertures 38 therethrough to reduce unnecessary weight while maintaining adequate part strength. Upper and lower ribs 40 may also be provided to enhance strength and rigidity of mounting bracket 12. In the embodiment shown in FIG. 2, ribs 40 are positioned to avoid interference with interfacing components, but it is contemplated that ribs 40 may be positioned elsewhere on mounting bracket 12. A plurality of attachment points 42 are provided about the periphery of mounting bracket 12 to attach wheel support assembly 10 to a frame member, as discussed in detail below.

A clamp bracket 44 may be attached to mounting bracket 12 via attachment points 42 to facilitate the mounting of mounting bracket 12 to an uneven, planar, or non-planar frame or surface. Aperture 46 is provided in a lower portion of tube portion 16 and is adapted to receive leg fastener 22 for affixation of leg 20 to mounting bracket 12, as shown in FIG. 2 and described in detail below. While mounting bracket 12 is shown and described as having an exemplary form and features, it should be appreciated that mounting bracket 12 may be modified within the scope of the present disclosure to accommodate the mounting of wheel support assembly 10 to any number of pivotable system components or structures. Further, an exemplary embodiment of bracket 12 is made of aluminum, but it is within the scope of the present disclosure that the mounting bracket may be made of a variety of suitable materials.

Leg 20 is a generally hollow tube having stepped upper portion 48 and straight lower portion 50. Stepped upper portion 48 is received within tube portion 16 of mounting bracket 12, so that a generally annular shoulder 52 contacts a lower surface of tube portion 16 to provide a depth stop for leg 20. Aperture 54 formed in upper portion 48 is sized and located to correspond with aperture 46 in tube portion 16, so that when annular shoulder 52 impinges upon the lower surface proximate the cavity of tube portion 16, apertures 46, 54 align. Leg fastener 22 may then be passed through both tube portion 16 of mounting bracket 12 and leg 20 to fix leg 20 to mounting bracket 12. Lower portion 50 of leg 20 includes a fastener hole or aperture 56 and a pinhole or aperture 58, which cooperate to longitudinally and rotationally fix yoke 26, as discussed in detail below. In an exemplary embodiment, leg 20 is a generally cylindrical hollow aluminum tube, but it is within the scope of the present disclosure that leg 20 may take a variety of suitable shapes and forms and may be made from a variety of suitable materials, such as a square or polygonal tube or bar made of steel, titanium, and/or carbon fiber, for example.

Figure 5A:
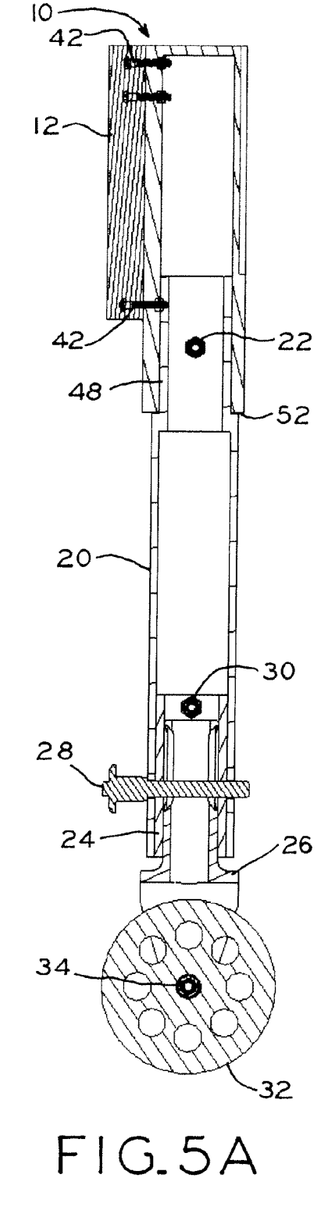
FIG. 5A is an elevation, section view of the wheel support shown in FIG. 1.
Figure 5B:
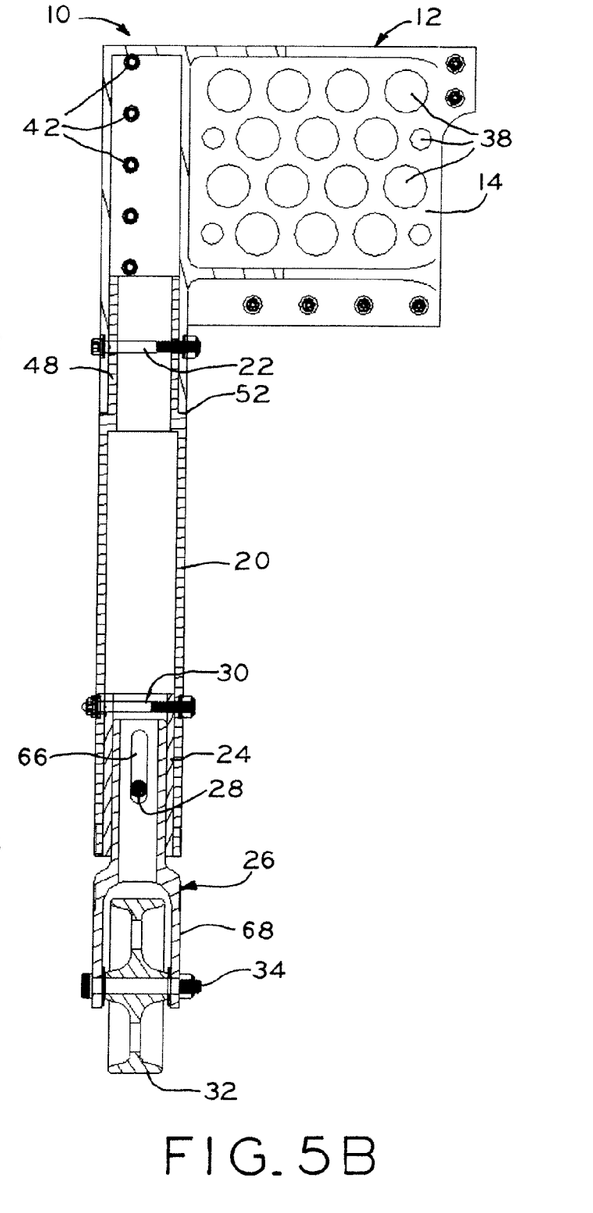
FIG. 5B is an elevation, section view of the wheel support shown in FIG. 1.

Bushing 24 includes fastener holes 60 at an upper portion thereof and pinhole 62 at a lower portion thereof. Fastener hole 60 is sized and positioned to correspond with fastener hole 56 of leg 20, so that bushing 24 is installed within the bore of leg 20 by passing bushing 24 into lower portion 50 until holes 56, 60 align, and then inserting fastener 30 therethrough (FIG. 5B). When bushing 24 is so affixed to leg 20, pinhole 62 aligns with pinhole 58 so that pin 28 may be passed through both components (FIG. 5A). As best seen in FIG. 2, pin may be tethered to leg 20 via fastener 30. In the illustrated embodiment, bushing 24 is a generally cylindrical tubular structure with threads formed on at least a portion of the inner bore thereof to receive threaded shaft 64 of yoke 26, as described below. In an exemplary embodiment, bushing 24 may be made of a hard and corrosion resistant material, such as stainless steel. For example, bushing 24 may be made of a 300 series stainless steel or a Nitronic stainless steel. However, it should be appreciated that bushing 24 may be made of a variety of suitable materials and may take a variety of suitable shapes and sizes, such as may be required by a particular application. Bushing may also be eliminated completely from wheel support 10, as discussed below.

Yoke 26 includes threaded shaft portion 64 with elongated slot 66 formed therethrough. With bushing 24 installed to leg 20 as described above, yoke 26 is assembled to leg 20 by threading threaded shaft portion 64 into the threaded bore of bushing 24. Thus, by rotating yoke 26 within bushing 24, wheel mount 68 of yoke 26 raises or lowers with respect to mounting bracket 12 along the longitudinal axis of leg 20. As most clearly shown in FIG. 5A, a certain angular orientation of yoke 26 results in a portion of elongate slot 66 aligning with pinholes 58, 62 so that pin 28 may be passed through leg 20, bushing 24 and yoke 26. When pin 28 is so received, yoke 26 is prevented from rotating and is therefore fixed in a particular vertical orientation.

Figure 1:
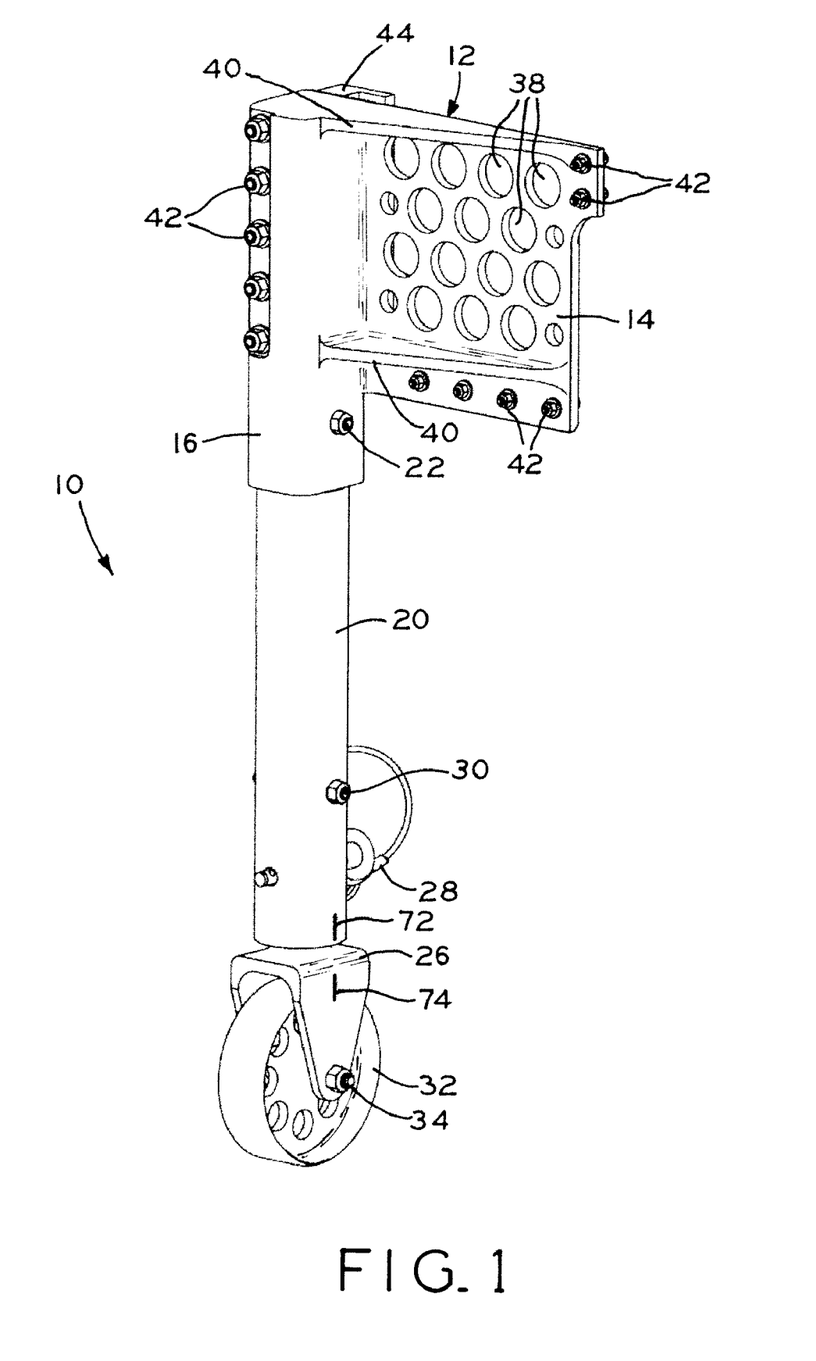
FIG. 1 is a perspective view of a wheel support assembly in accordance with the present disclosure.

Referring now to FIGS. 1 and 2, leg 20 may optionally include at least one registration mark 72, such as an engraving, indentation, marking or the like. Yoke 26 may include a corresponding registration mark 74 positioned and oriented to visually align with mark 72 when slot 66 is aligned with pinholes 58, 62. Thus, registration marks 72, 74 facilitate the process of vertically adjusting yoke 26 by allowing for easy visual identification of proper alignment between yoke 26 and leg 20. In an exemplary embodiment, threaded shaft portion 64 of yoke 26 is a hollow tube, as illustrated in FIGS. 5A and 5B. This hollow tube has sufficient strength to support wheel support 10, while reducing the overall weight of wheel support 10. However, it is contemplated that the threaded shaft may take other forms, such a solid shaft, for example.

With pin 28 removed, yoke 26 may be rotated within bushing 24 in multiples of 180° to raise or lower wheel mount 68 by an amount equal to ½ of the thread pitch of threaded shaft 64. In an exemplary embodiment, three full rotations of yoke 26 (i.e., 1080°) results in 0.250 inches of vertical adjustment (i.e., 0.083 inches of vertical travel per full rotation of 360°), but it will be understood that the thread pitch of threaded shaft 64 may be varied to suit any particular application. Once yoke 26 has been properly adjusted, and with slot 66 properly aligned as indicated by registration marks 72, 74, pin 28 may be reinserted through holes 58, 62 and slot 66 to once again rotationally fix yoke 26 with respect to wheel support assembly 10. Elongate slot 66 has sufficient length to allow for substantial vertical adjustability of yoke 26 while still allowing pin 28 to pass therethrough.

Yoke 26 may, for example, be made of a relatively hard and corrosion resistant material, such as stainless steel. In an exemplary application, yoke 26 may be made of 17/4 hardened stainless steel. Illustratively, a yoke made of this material may thread into a 300 series stainless steel bushing with minimal wear on the threaded shaft of the yoke. While the bushing is also expected to have a long service life, it is easily replaceable if the threads in the inner bore thereof become worn due to repeated vertical adjustment of yoke 26. In the exemplary embodiment described above, yoke 26 is made a harder material as compared to bushing 24, so that the easily replaceable and less expensive bushing 24 will wear our earlier than yoke 26.

Moreover, preventing a steel component from threading directly into an aluminum component ensures long life of the aluminum, because relatively hard steel threads may damage relatively soft aluminum threads. Similarly, a stainless steel component threadably engaging another 300 series stainless steel component may result in galling of the material at the threads, which may result in seizing of the threaded connection. Thus, the materials and configurations chosen for exemplary embodiments of yoke 26 and bushing 24, as discussed in detail above, represent an a combination of resiliency, light weight, and longevity. However, it will be appreciated that various materials may be used for yoke 26 within the scope of the present disclosure.

Wheel 32 is received within wheel mount portion or area 68 of yoke 26. Axle 34 passes through a first axle hole 70, then through wheel 32, and finally through a second axle hole 70 to rotatably couple wheel 32 with yoke 26. As noted above, washers 36 may be disposed between each side of wheel 32 and the inner faces of wheel mount 68 to promote smooth rotation of wheel 32 about axle 34. In an exemplary embodiment, wheel 32 may be made of anodized aluminum. However, it should be appreciated that wheel 32 may be made of a variety of suitable materials within the scope of the present disclosure. Also in an exemplary embodiment, washers 36 may be made of a low friction material, such as Delrin®, for example (Delrin® is a registered trademark of E.I. Du Pont de Nemours and Company, Co. of Wilmington, Del.). Delrin® is a relatively low-cost, low-friction material that produces few, if any, shavings or particles of material as it wears. It should also be appreciated that washers 36 may be made of a variety of suitable materials within the scope of the present disclosure, such as Teflon® material (Teflon® is a registered trademark of E.I. Du Pont de Nemours and Company, Co. of Wilmington, Del.), bronze or bronze alloys, for example.

Figure 3:
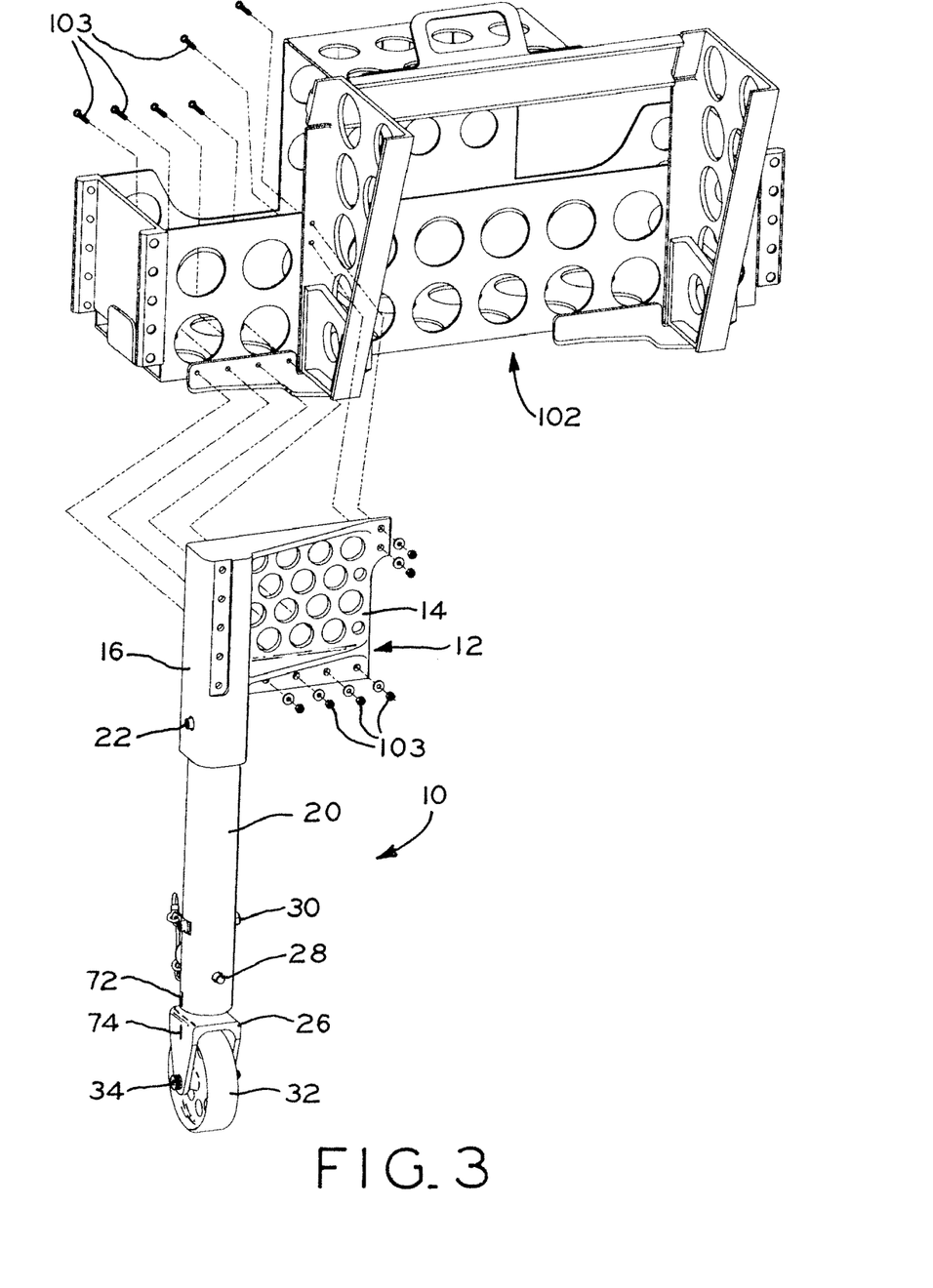
FIG. 3 is a perspective view of the wheel support assembly shown in FIG. 1 together with a frame member of a pivotable system, illustrating the attachment of the wheel support assembly to the frame member.
Figure 4:
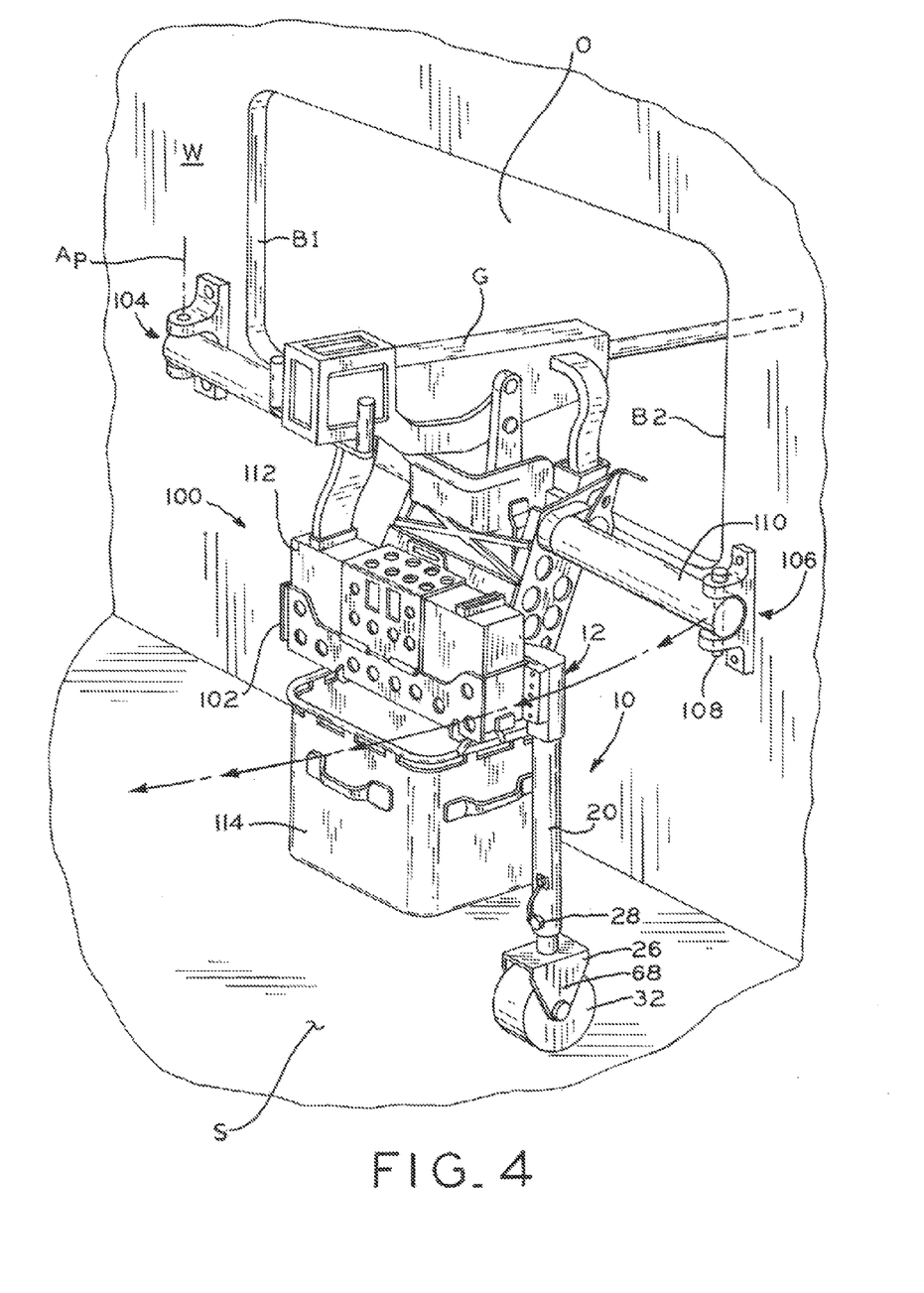
FIG. 4 is a perspective view of an exemplary wheel support assembly in accordance with the present disclosure attached to a pivotable system.

Turning now to FIGS. 3 and 4, wheel support assembly 10 may be mounted to a frame member 102 of a pivotable system 100. Fasteners 103 pass through attachment points 42 on plate portion 14, and through corresponding attachment points on frame member 102. Thus, wheel support assembly 10 is firmly and redundantly affixed to pivotable system 100. With wheel support assembly 10 so affixed, the vertical position of wheel 32 (and yoke 26) is ready to be adjusted.

Referring now to FIG. 4, pivotable system 100 may, for example, be a pintle mount machine gun G. In an exemplary embodiment, machine gun G may be a Medium Window Pintle, GAU-21 .50 caliber machine gun, manufactured by FN Herstal, S.A. of Herstal, Belgium. Pivotable system 100 is shown mounted to arm 110 spanning opening O, which may be a window or door in the side of a structure such as a vehicle or building. In an exemplary embodiment, arm 110 may be mounted within a window or door in the side of a CH-53E Helicopter, manufactured by Sikorski Aircraft Corporation of Stratford, Conn. However, a wheel support made in accordance with the present disclosure may be used with any number of pivotable systems and in any number of environments.

Arm 110 is pivotably connected to a first connector or support 104 mounted to wall W, and removably connected to a second connector or support 106 mounted to wall W. In the illustrative embodiment of FIG. 4, connectors 104, 106 are disposed at opposite ends or boundaries of opening O so that the weight of pivotable system 100 is supported at both ends of arm 110. When pivotable system 100 is supported by arm 110 at both of connectors 104, 106, wheel support assembly 10 is ready to be adjusted as described below. Each of connectors 104, 106 has a vertically disposed pin, with the pin acting as a pivot point for connector 104 and as a removable connection for connector 106. In the illustrated embodiment of FIG. 4, arm 110 is a round tubular structure and connectors 104, 106 are U-shaped structures sized to receive arm 110. Connector 106 may further include a chamfered portion to aid in guiding arm 110 into the U-shaped portion of the connector. Once arm 110 is received within connector 106, the removable pin may be inserted through connector 106 and arm 110 to fix arm 110 at its ends. In the illustrated embodiment of FIG. 4, the span from the pivot pin of connector 104 to the removable pin of connector 106 is approximately 39.75 inches, the span from the pivot pin to the center of gravity of machine gun G is approximately 17.5 inches, and the span from the pivot pin to the axis of the leg 20 of wheel support 10 is approximately 32 inches (as discussed below). In this illustrated embodiment, leg 20 of wheel support is of sufficient length to allow wheel support 10 to span a gap of about 24 inches from support surface S to the bottom of frame 102.

To adjust support assembly 10, pin 28 is first withdrawn from leg 20, bushing 24 and yoke 26 so that yoke 26 and wheel 32 are rotatable about the axis of leg 20. Yoke 26 and wheel 32 are rotated to vertically adjust wheel 32 until the lower most point of wheel 32 is nearly in contact with, but spaced apart from support surface S. For example, wheel 32 may be adjusted to dispose it above support surface S with a spacing of as little as almost zero inches (i.e. about 0.001 inches), 0.040 inches or 0.080 inches, or as much as 0.125 inches, 0.250 inches or 0.375 inches, or within any range defined by any of the foregoing values. However, the spacing between the wheel and the support surface may fall outside these ranges depending on the particular geometry and configuration of the pivotable system to which the wheel support assembly is attached, such as weight of the pivotable system, flexibility of various components thereof, the nature and configuration of the support surface, the span between support brackets and the like.

With wheel 32 at an appropriate height above surface S, and with slot 66 of yoke 26 aligned with pinholes 58, 62, pin 28 may be reinserted to vertically fix wheel 32 (i.e., by preventing further rotation of yoke 26). Wheel support assembly 10 is arranged so that axis $A_W$ of wheel 32 (FIG. 2) is approximately normal or perpendicular with pivot axis $A_p$ of pivotable system 100 (FIG. 4), which in turn is oriented generally normal to the support surface. This geometrical arrangement allows yoke 26 and wheel 32 to be rotationally fixed about the axis of leg 20, as discussed above, while also allowing wheel 32 to rotate smoothly as pivotable system 100 is pivoted about axis $A_P$, as discussed below.

Referring still to FIG. 4, with wheel support assembly 10 properly mounted to frame 102 and adjusted as described above, pivotable system 100 may be pivoted about axis $A_P$. For example, locking pin 108 may be removed from second connector 106, thereby allowing one side of an arm or support member 110 of pivotable system 100 to be removed from second connector 106 and pivoted about axis $A_P$ of first connector 104. As the end of arm 110 clears second connector 106, the weight of pivotable system 100 becomes cantilevered about first connector 104, rather than being supported from both sides by both of connectors 104, 106. This cantilevered weight causes one or more deflections in the systems supporting the weight, such as in frame 102, arm 110, first connector 104 and the wall W to which pivotable system 100 is mounted. This deflection causes the gap between wheel 32 and support surface S to close, bringing wheel 32 to rest against support surface S. Wheel support assembly 10, when in contact with support surface S, again supports pivotable system 100 at both ends of arm 110 rather than allowing the full weight of pivotable system 100 to be supported in a cantilevered fashion. The space or gap between wheel 32 and support surface S may be configured to be small enough to prevent excess deflection in any of the materials of pivotable system 100 or wall W, such as less than about 0.375 inches as discussed above. With pivotable system 100 so supported, the system may be rotated away from opening O, such as to facilitate ingress or egress therethrough. Pivotable system 100 may be rotated back into a position disposed within opening O, and the end of arm 110 may be reengaged with second connector 106, thereby lifting wheel support assembly 10 off of surface S.

Moreover, wheel support 10 may be used on previously existing pivotable systems. In the case of a pivotable system within a helicopter, for example, the pivotable system may use door hinge mounting locations for the pivoting function. However, the pivotable system, such as a machine gun, may be substantially heavier and/or subject to different forces as compared with a door, so that the door hinge mounting point may be subjected to loads for which it was not originally designed. In such a "retrofit" arrangement, wheel support assembly 10 may be used to travel provide additional support.

Optionally, wheel 32 may cooperate with a groove or track in the floor. Such a track may serve to protect the finish of the floor and/or any armor disposed between the floor and the wheel. Moreover, the armor typically used in helicopter floors is relatively abrasive, and unarmored floors may have sand or dirt that leads to abrasiveness. In this situation, a groove or track may operate to extend the service life of wheel 32. However, the aluminum material chosen for an exemplary embodiment of wheel 32 strikes a balance between durability and preservation of the floor or armor surface coatings. By design, the wheel may be made of a soft enough material to avoid damage to a protective coating used on the helicopter floor or floor armor, while still being hard enough to offer a long service life. Also, wheel 32 is easily replaceable when worn. For example, wheel 32 and washers 36 may be sold as a replacement-parts kit, which can be mounted to wheel support 10 by removing axle 34.

One feature of a wheel support assembly made and used in accordance with the present disclosure is that it can support a heavy pivotable system, thereby preventing damage to system components, mounting components, or mounting surfaces. For example, in the embodiment illustrated in FIG. 4, wheel support assembly 10 may be used to support a pintle mount machine gun G such as the GAU-21 (discussed above). An ammunition container 112 may be received within frame member 102, and a receptacle 114 may also be supported by frame member 102 for catching spent cartridge casings and/or the links connecting the casings. This machine gun system may, for example, weigh approximately 300 pounds and may be mounted to the wall of an aircraft, such as the airframe of a CH-53E helicopter (as discussed above). When such a system is pivoted about axis $A_P$, wheel support assembly 10 may act to prevent excessive stresses from accumulating in the airframe proximate the boundary of opening O.

In an illustrated embodiment, the center-of-gravity of machine gun G is not directly over the support arm, nor is it directly over the wheel. As a result, the motion or "sag" of the support arm at the detachable connection point (i.e., the aft mounting point) is not directly proportional to the gap between the wheel and the floor. However, wheel support 10 is still useable in this configuration. In the exemplary system described above (i.e., a GAU-21 pintle mount machine gun supported by the airframe of a CH-53E helicopter across a span of approximately 39.75 inches), support arm 110 may "sag" by about 0.25 inches upon removal of support arm 110 from connector 106. In this exemplary system, this 0.25-inch "sag" corresponds to a gap size between wheel 32 and support surface S of about 0.080 inches.

Further, because wheel support 10 prevents excessive downward motion of arm 110, reengagement of the end of arm 110 with second connector 106 will be made easier. Moreover, a machine gun system such as the one shown in FIG. 4 places both static and dynamic loads on first connector 104 and the surrounding structures if the weight of pivotable system 100 is allowed to be cantilevered about axis $A_P$. Thus, wheel support assembly 10 prevents not only the weight of gun G and associated items from being supported entirely by first connector 104 and the surrounding mounting surfaces, but also prevents dynamic loads that may arise from acceleration of that weight, such as from motion of the vehicle.

Another feature of wheel support assembly 10 is that it may be lightweight. In an exemplary embodiment using exemplary materials as discussed above, wheel support assembly 10 may weight approximately 8 pounds. For example, bushing 24 is optional and may be excluded from wheel support assembly 10. However, bushing 24 allows the threaded engagement between yoke 26 and leg 20 to be a steel-on-steel engagement, thereby allowing leg 20 to be made of lightweight aluminum without compromising the longevity of the threaded engagement of yoke 26.

A further feature of a wheel support assembly made and used in accordance with the present disclosure is that it requires no manipulation after the initial setup procedure (described above). Once installed, the wheel support assembly becomes a part of the pivotable system to which it is attached, and it will perform its load bearing function whenever the pivotable system is pivoted away from the removable support.

Still another feature of a wheel support assembly made in accordance with the present disclosure is that it is adapted to be "passive" when not in use. That is to say, the assembly does not touch the support surface when the pivotable system is supported at both ends. For example, many machine gun systems or other systems mounted within an opening have frames and components that have been carefully designed for strength, longevity and stability, such as by using finite element analysis (FEA) techniques to optimize materials and geometries. A wheel support assembly made and used in accordance with the present disclosure can be retrofitted to such designs without substantially altering FEA and other engineering analyses. More particularly, because the wheel support assembly is adapted to remain out of contact with the support surface when the pivotable system is in the "in service" position (i.e., supported by both a first and second connector at both opening boundaries), no change to the stability or load bearing analyses of the pivotable system is necessary.

Moreover, the vertical adjustability of the yoke and wheel allows for changes to the support surface with which they engage, such as the addition of a support surface covering. In an exemplary embodiment, the vertical adjustability of wheel 32 and yoke 26 is sufficient to accommodate the addition of armor to the bottom of a helicopter floor, where the armor may be, for example, 0.50 inches thick.

While the embodiment shown in FIG. 4 includes machine gun G and associated systems, a wheel support assembly in accordance with the present disclosure may be used with a variety of non-lethal and civilian systems. For example, the pivotable system to which the wheel support assembly is attached may support a water canon for non-lethal crowd control or firefighting. Another alternative embodiment of the pivotable system may support a camera or other recording equipment, such as recording equipment used within a window or door of a helicopter. Yet another alternative embodiment includes aircraft loading and/or rescue systems, such as hoists and cranes. Further, a system that is vertically adjustable along the pivot axis may benefit from a wheel support in accordance with the present disclosure, such as when the adjustable system is moved downwardly. Moreover, it is contemplated that a wheel support assembly in accordance with the present disclosure may be scaled to a larger or smaller size in order to accommodate larger or smaller systems that may otherwise experience a cantilevered weight as they rotate about an axis.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A pivotable assembly mounted above a support surface and within an opening in a wall, the assembly comprising:
   a pivotable system;
   an arm having a pivot with a pivot axis oriented normal to the support surface, said pivotable system attached to said arm, said arm having a first end mounted at the pivot and a second end spaced away from the pivot, the arm being disposed within an opening and extending across a span of the opening, the first end of the arm being pivotably connected proximate a first boundary of the opening, and the second end of the arm being removably connected proximate a second boundary of the opening;

a wheel support attached to said pivotable system at a position spaced from said pivot axis, said wheel support comprising:

an extension member having a longitudinal axis and an aperture running transversely through said extension member, said extension member extending generally downwardly from the pivotable system;

a bushing fixed to said extension member, said bushing having an inner bore that is at least partially threaded;

a yoke having a threaded shaft with an elongate slot therethrough, said yoke threadably received within the inner bore of said bushing so that said yoke is vertically adjustable with respect to said extension member;

a pin sized to be receivable in said aperture and in said slot, said yoke being rotationally and vertically fixed with respect to said extension member when said pin is received within said slot; and a wheel having an axis of rotation substantially normal to the longitudinal axis of the extension member, said wheel rotatably attached to said yoke, wherein said wheel is vertically adjustable with respect to said extension member;

wherein said wheel of said wheel support is vertically adjusted to define a gap between said support surface and said wheel when said arm is connected proximate the second boundary of the opening, the gap sized so that said wheel touches the support surface when said second end of said arm is not connected proximate the second boundary of the opening;

wherein said wheel support is attached to said pivotable system via a mounting bracket having a mounting plate portion and a mounting tube portion, said extension member being mounted to said mounting tube portion and said pivotable system being mounted to said mounting plate portion.

2. The pivotable assembly of claim 1, wherein said pivotable system is spaced a first distance from the pivot axis and said wheel support is spaced a second distance from the pivot axis, said first distance being less than said second distance.

3. The pivotable assembly of claim 2, wherein said first distance is equal to at least half of the span of the opening.

4. The pivotable assembly of claim 1, wherein said wheel support is attached to said pivotable system via a mounting bracket having a mounting plate portion and a mounting tube portion, said extension member being mounted to said mounting tube portion and said pivotable system being mounted to said mounting plate portion.

5. The pivotable assembly of claim 1, wherein the gap correlates to an amount of downward motion of said second end of said arm when said second end is not connected to the second boundary of the opening.

6. The pivotable assembly of claim 5, wherein the downward motion of said second end of said arm, as measured when said second end is disconnected from the second boundary, increases as the gap, as measured when said second end is connected proximate the second boundary, increases, the increase in downward motion being disproportionate to the increase in gap size.

7. The pivotable assembly of claim 5, wherein the downward motion, as measured when said second end is disconnected from the second boundary, is about 0.25 inches when the gap, as measured when said second end is connected proximate the second boundary, is about 0.080 inches.

* * * * *